United States Patent
Abe (10) Patent No.: US 6,205,333 B1
(45) Date of Patent: Mar. 20, 2001

(54) MOBILE COMMUNICATION SYSTEM AND MOBILE COMMUNICATION APPARATUS IN WHICH WAIT TIME IS EXTENDED

(75) Inventor: Yuichi Abe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/114,234

(22) Filed: Jul. 2, 1998

(30) Foreign Application Priority Data

Feb. 2, 1998 (JP) .................................................. 10-020739

(51) Int. Cl.[7] .............................. H04Q 7/20; H04B 7/00
(52) U.S. Cl. .......................... 455/432; 455/522; 455/70; 455/574; 370/311
(58) Field of Search ..................................... 455/432, 434, 455/515, 574, 522, 67.1, 68, 69, 70, 572, 127, 373, 38.3, 418, 419, 420, 556, 557, 558, 559; 370/31.1

(56) References Cited

U.S. PATENT DOCUMENTS

| 5,301,225 | 4/1994 | Suzuki et al. |
| 5,539,748 | * 7/1996 | Raith .................................. 455/38.3 |
| 5,649,315 | * 7/1997 | Eaton .................................. 455/343 |
| 5,924,017 | * 7/1999 | Pinter et al. ........................ 455/343 |

FOREIGN PATENT DOCUMENTS

| 0711089 | 5/1996 | (EP). |
| WO94/08432 | 4/1994 | (WO). |

* cited by examiner

Primary Examiner—Reinhard J. Eisenzopf
Assistant Examiner—Lester G. Kincaid
(74) Attorney, Agent, or Firm—Helfgott & Karas, P.C.

(57) ABSTRACT

Radio communication is performed between a base station and a mobile communication apparatus including a speech signal processing unit, a codec unit, a radio unit, a power supply control unit and a main control unit. An intermittent reception ratio between a period of calls from the base station to the mobile communication apparatus and a period of intermittent reception effected by associated periodic supply of the operating power from the battery is set in an intermittent reception ratio setting unit implemented by a processor in a main control unit and a mode flag in a memory, in accordance with extended information items contained in announcement information from the base station. The intermittent reception ratio may alternatively be set by a terminal device connected to the mobile communication apparatus via a connection unit. The power supply control unit supplies an operating power to a reception unit in accordance with the intermittent reception ratio set in the intermittent reception ratio setting unit.

7 Claims, 7 Drawing Sheets

FIG.1A

| INFORMATION ITEM | INFORMATION LENGTH |
|---|---|
| MESSAGE TYPE | 1 |
| NETWORK NUMBER | 2 |
| REGULATION INFORMATION | 3 |
| CONTROL CHANNEL CONSTRUCTION INFORMATION | 6 ~ 33 |
| DESIGNATED TRANSMISSION POWER FOR TRANSMISSION TO MOBILE STATION | 1 |
| WAIT ENABLE LEVEL | 1 |
| WAIT DETERIORATION LEVEL | 1 |
| MULTIPLICITY OF LOCATION REGISTRATION AREAS (N) | 1 |
| LOCATION ID | 1 |
| ≀ | |
| LOCATION ID | 1 |
| MAXIMUM NUMBER OF REPORT CHANNELS | 1 |
| NUMBER OF PERCH CHANNELS (M) FOR DETERMINING ZONE / SECTOR | 1 |
| PERCH CHANNEL NUMBER | 1 |
| ≀ | |
| PERCH CHANNEL NUMBER | 1 |
| LOCATION REGISTRATION TIMER | 1 |
| LENGTH OF EXTENDED INFORMATION ITEM (K) | K |
| (EXTENDED INFORMATION ITEMS) | |

| (OCTET) | 8 | 7 | 6 | 5 | 4 | 3 | 2 | 1 (BIT) |
|---|---|---|---|---|---|---|---|---|
| LENGTH OF EXTENDED INFORMATION | 0 | 0 | 0 | 0 | 0 | 0 | 0 | 0 |
| EXTENDED INFORMATION ITEM (1) | a8 | a7 | a6 | a5 | a4 | a3 | a2 | a1 |
| EXTENDED INFORMATION ITEM (2) | b8 | b7 | b6 | b5 | b4 | b3 | b2 | b1 |
| EXTENDED INFORMATION ITEM (3) | c8 | c7 | c6 | c5 | c4 | c3 | c2 | c1 |
| EXTENDED INFORMATION ITEM (4) | d8 | d7 | d6 | d5 | d4 | d3 | d2 | d1 |
| EXTENDED INFORMATION ITEM (5) | e8 | e7 | e6 | e5 | e4 | e3 | e2 | e1 |

FIG.5A

| TYPE | $D_7$ | $D_6$ | $D_5$ | $D_4$ | $D_3$ | $D_2$ | $D_1$ | $D_0$ |
|---|---|---|---|---|---|---|---|---|
| INTERMITTENT RECEPTION CONTROL REQUEST | 1 | 1 | 1 | 0 | 1 | 1 | 1 | 1 |
|  | 0 | 0 | 0 | 0 | 0 | 0 | 1 | 0 |
| INTERMITTENT RECEPTION CONTROL INFORMATION | 1 | 0 | 0 | 0 | 1 | 1 | 1 | 0 |
|  | 0 | 0 | 0 | 0 | $k_7$ | $k_6$ | $k_5$ | $k_4$ |
|  | 0 | 0 | 0 | 0 | $k_3$ | $k_2$ | $k_1$ | $k_0$ |

FIG.5B

| TYPE | $D_7$ | $D_6$ | $D_5$ | $D_4$ | $D_3$ | $D_2$ | $D_1$ | $D_0$ |
|---|---|---|---|---|---|---|---|---|
| INTERMITTENT RECEPTION CONTROL RESPONSE | 1 | 1 | 1 | 0 | 1 | 1 | 1 | 1 |
|  | 0 | 0 | 0 | 0 | 0 | 0 | 1 | 0 |
| INTERMITTENT RECEPTION CONTROL INFORMATION ACKNOWLEDGEMENT | 1 | 0 | 0 | 0 | 1 | 1 | 1 | 1 |
|  | 0 | 0 | 0 | 0 | 1 | 0 | 0 | 0 |

MOBILE COMMUNICATION SYSTEM AND MOBILE COMMUNICATION APPARATUS IN WHICH WAIT TIME IS EXTENDED

BACKGROUND OF THE INVENTION

1. Field of the Invention

The present invention generally relates to a mobile communication system including a base station and mobile communication apparatuses such as portable telephones, and a mobile communication apparatus used in such a system. More particularly, the present invention relates to a mobile communication system and a mobile communication apparatus in which a wait time is extended.

A mobile communication apparatus such as a portable telephone has a built-in battery or is detachably coupled to a battery. Call origination, call proceeding and call incoming are controlled using the operating power supplied by the battery. The base station calls a mobile communication apparatus at predetermined intervals so that an extended wait time of the mobile communication apparatus is insured by supplying the power from the battery at the same intervals as the intervals at which the base station calls the mobile communication apparatus. Given the same wait time, such an approach is effective in reducing the size and weight of the battery. There is a demand for extending the wait time of the mobile communication apparatus.

2. Description of the Related Art

The format of transmission from a base station is such that 36 subframes constitute 1 superframe, wherein one subframe has a duration of 20 ms so that 1 superframe has a duration of 720 ms. Generally, 1 subframe in 1 superframe is used to call a mobile communication apparatus. The subframe used to call the mobile communication apparatus (hereinafter, referred to as a call subframe) is identified by announcement information from the base station. The mobile communication apparatus in a zone served by the base station performs intermittent reception such that the operating power is supplied for 20 ms immediately preceding the call subframe, from a battery to a radio reception unit. Upon detecting the call, the mobile communication apparatus generates a ringing tone and responds to the incoming call, whereupon speech communication proceeds.

Figure 1A:
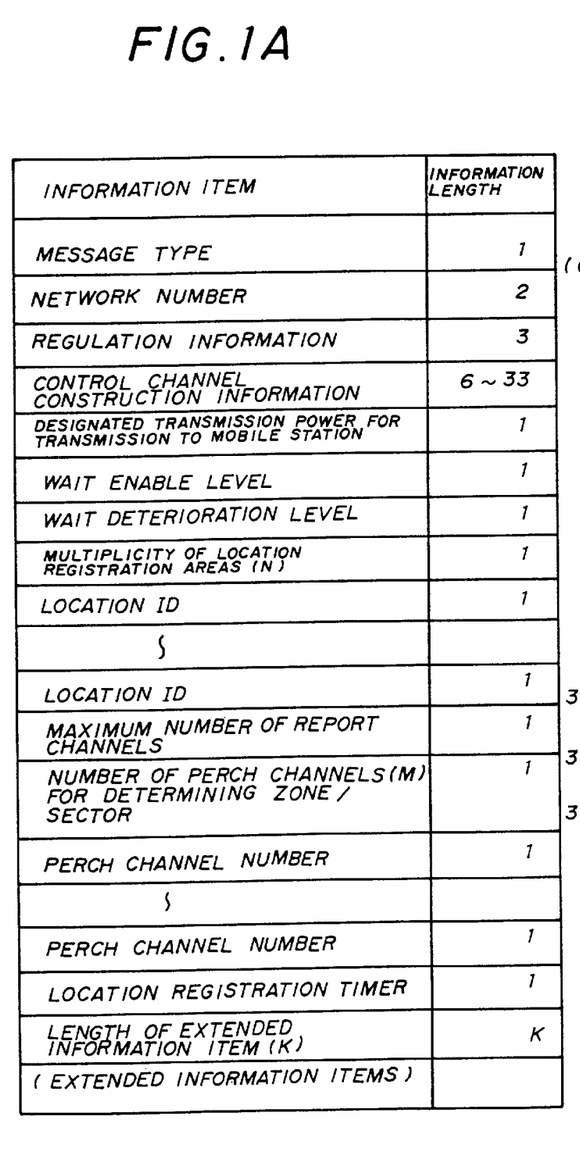
FIGS. 1A and 1B show information items contained in announcement information.

The base station transmits announcement information adapted for the base station. As shown in FIG. 1A, the announcement information contains information items including a message type, a network number, regulation information, control channel construction information, designated transmission power for transmission to a mobile station, a wait enable level, a wait deterioration level, multiplicity of location registration areas, the maximum number of report channels, the number of perch channels for determining zone/sector, a location registration timer, extended information items and the like.

Figure 2:
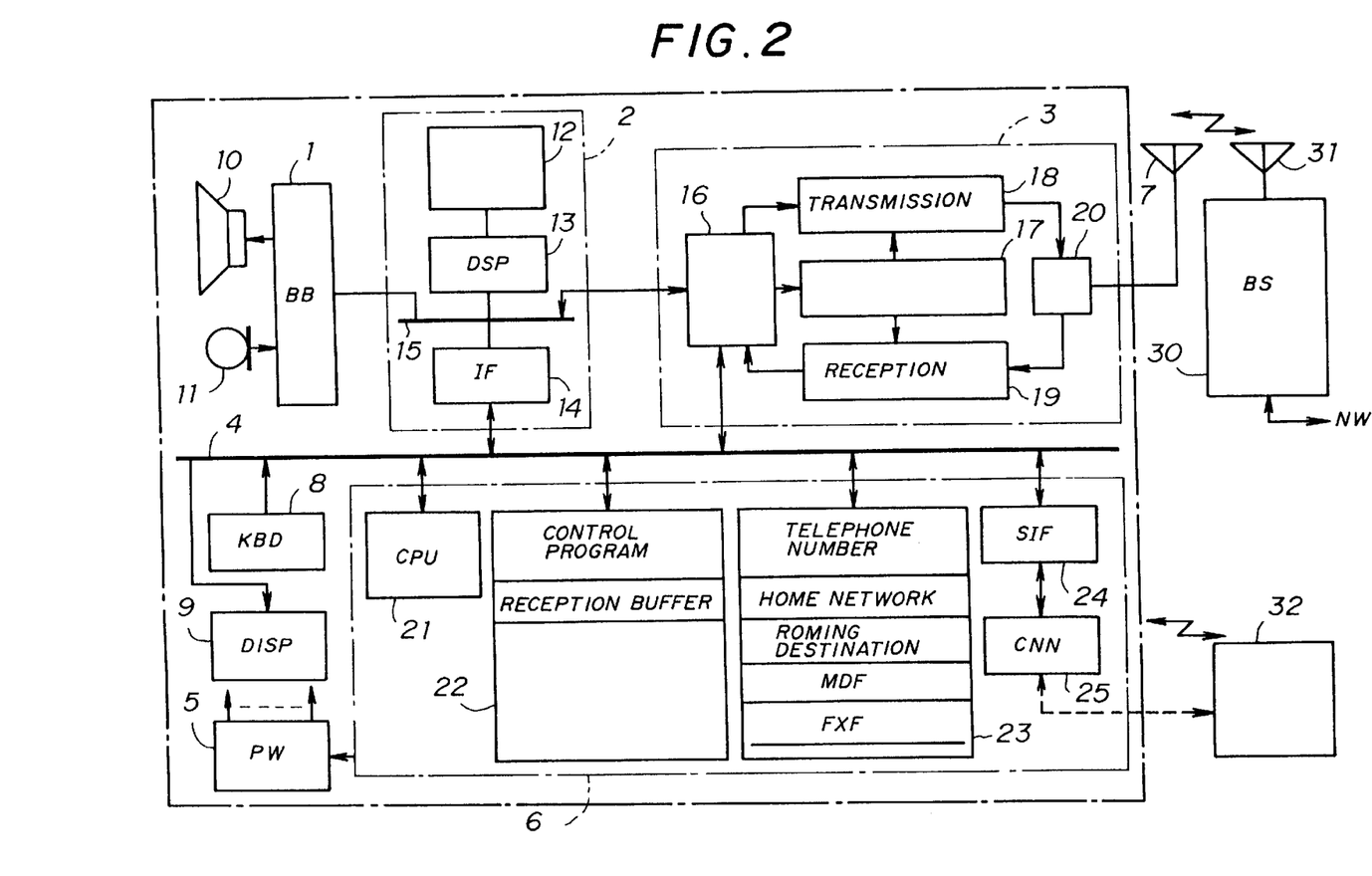
FIG. 2 shows a mobile communication apparatus according to an embodiment of the present invention.

As shown in FIG. 2B, the control channel construction information items include Np, Nc, Ab, Ap, As1, As2, $F_1$, $S_1$-$F_{NC}$, $S_{NC}$, where Np indicates the number of groups of mobile stations per a channel, Nc indicates the number of control channels in a zone (including the perch channels), Ab indicates the number of BCCH (announcement channel) slots per a control channel, Ap indicates the number of PCH (control channel) slots per a group, As1 indicates the number of SCCH (control channel) slots succeeding BCCH, As2 indicates the number of SCCH slots succeeding PCH, $F_1$, $S_1$-$F_{NC}$, $S_{NC}$ indicates frequency codes of the control channels and slot numbers.

A mobile station enters a wait state in a perch channel, based on the control channel construction information contained in the announcement information. The mobile station may also switch from the perch channel to a designated control channel. Since 1 subframe of the 36 subframes in a 720 ms superframe is used as a call subframe, the maximum intermittent reception ratio in the conventional mobile station is 20/720=1/36. Thus, the wait time is extended as compared to a case where the battery continually supplies an operating power.

In a mobile communication system, the frequency of call incoming to the mobile station (mobile communication apparatus) may vary depending on the behavior of users. Generally, the frequency of call incoming also varies significantly depending on the time zone and the area. It is also to be noted that reduction of the battery size is also requested in addition to the extension of the wait time. However, the conventional mobile station only achieves extension of the wait time by setting the intermittent reception ratio to, for example, 1/36, as described above. Further extension of the wait time has not been available.

SUMMARY OF THE INVENTION

Accordingly, an object of the present invention is to provide a mobile communication system and a mobile communication apparatus in which the aforementioned problems are eliminated.

Another and more specific object of the present invention is to provide a mobile communication system and a mobile communication apparatus in which significant extension of a wait time is achieved by modifying the intermittent reception ratio.

The aforementioioned objects can be achieved by a mobile communication system comprising: a base station; and a plurality of mobile communication apparatuses called by the base station at predetermined intervals, wherein the mobile communication apparatus comprises: a power supply control unit for supplying an operating power from a battery to the mobile communication apparatus; an intermittent reception ratio setting unit for setting an intermittent reception ratio between a period of calls from the base station to the mobile communication apparatus and a period of intermittent reception effected by associated periodic supply of the operating power from the battery, and for controlling the power supply control unit in accordance with the intermittent reception ratio.

The base station may notify the mobile communication apparatus of the intermittent reception ratio, using extended information items in announcement information delivered from the base station to the mobile communication apparatus, and the mobile communication apparatus may set the intermittent reception ratio designated by the extended information items in the intermittent reception ratio setting unit.

The mobile communication apparatus may set, in the intermittent reception ratio setting unit, the intermittent reception ratio designated by extended information items contained in announcement information from the base station of a home network.

The mobile communication apparatus may disregard the intermittent reception ratio designated by extended information items contained in announcement information from the base station of a roaming network, and set a basic intermittent reception ratio in the intermittent reception ratio setting unit.

The extended information items contained in the announcement information may designate one of a permanently fixed basic intermittent reception ratio, a fixed basic intermittent reception ratio, a permanently fixed extended intermittent reception ratio and a fixed extended intermittent reception ratio; a determination may be made as to whether the intermittent reception ratio is to be modified by referring to the extended information items; and the intermittent reception ratio setting unit may be controlled accordingly.

The mobile communication apparatus may comprise a connection unit for connecting with a terminal device by one of a cable connection and an infrared connection, and the intermittent reception ratio to be set in the intermittent reception ratio may be determined by referring to intermittent reception ratio setting information provided by the terminal device via the connection unit.

The aforementioned objects can also be achieved by a mobile communication apparatus comprising: a radio unit including a transmission unit and a reception unit so as to perform transmission and reception with respect to a base station; a codec unit for encoding a speech signal and decoding an encoded signal; a speech signal processing unit for subjecting a speech signal to analog/digital conversion; a main control unit for controlling the entirety of the mobile communication apparatus; a power supply control unit for supplying an operating power from a battery to components of the mobile communication apparatus; and an intermittent reception ratio setting unit for setting an intermittent reception ratio between a period of calls from the base station to the mobile communication apparatus and a period of intermittent reception effected by associated periodic supply of the operating power from the battery, and for controlling the power supply control unit in accordance with the intermittent reception ratio.

The intermittent reception ratio setting unit may comprise a memory for storing setting information containing a first bit indicating one of a permanently fixed setting and a fixed setting, a second bit indicating whether a basic intermittent reception ratio or an extended intermittent reception ratio is to be set, and a bit train indicating a factor by which the basic intermittent reception ratio is to be multiplied.

Given that a base station calls a mobile communication apparatus at a basic ratio, that is, using 1 subframe of 1 superframe, the period of intermittent reception may be extended and the power consumption is reduced by setting an extended ratio in the intermittent reception ratio setting unit of the mobile communication apparatus. Thus, the present invention achieves an objective of significantly extending the wait time. By constructing the system such that setting of the intermittent reception ratio is performed by the base station, setting of the intermittent reception ratio adapted for intermittent calls from the base station is enabled.

The subframe used for a call from the base station may be timed to concur with the intermittent reception in the mobile communication apparatus, by designating the head of the multi-superframe, using the announcement information. In a system in which the home network and the roaming network coexist, control effected in the roaming network may be unknown. In this case, it is ensured that a call from the base station is properly received by the mobile communication apparatus by reverting to intermittent reception at a basic ratio.

BRIEF DESCRIPTION OF THE DRAWINGS

Other objects and further features of the present invention will be apparent from the following detailed description when read in conjunction with the accompanying drawings, in which.

DETAILED DESCRIPTION OF THE PREFERRED EMBODIMENTS

FIG. 2 shows a mobile communication apparatus according to an embodiment of the present invention. The mobile communication apparatus comprises 1 speech signal processing unit 1 (BB), a codec unit 2, a radio unit 3, a common bus 4, a power supply control unit (PW) 5, a main control unit 6, an antenna 7, a key input unit (KBD) 8 such as a 10-key pad, a display unit (DISP) 9 such as a liquid crystal panel, a speaker (ear receiver) 10, a microphone (telephone microphone) 11, a memory 12, a digital signal processor (DSP) 13, an interface (IF) 14, an internal bus 15, a communication controller 16, a synthesizer 17, a transmission unit 18, a reception unit 19, a common transmission and reception unit 20, a processor (CPU) 21, memories 22 and 23, a serial data interface unit (SIF) 24, a connection unit (CNN) 25, a base station (BS) 30, an antenna 31, a terminal device 32 such as a personal computer, and a mobile switched network NW.

The codec 2 encodes a speech signal and decodes the encoded signal, using the DSP 13. The speech signal processing unit 1 is interposed between the speaker 10 and the microphone 11 so as to perform D/A conversion and A/D conversion. In the radio unit 3, the synthesizer 17 sets the frequency of transmission from the transmission unit 18 and the frequency of reception by the reception unit 19, under the control of the communication controller 16.

The main control unit 6 includes the processor 21, the memories 22 and 23, the serial data interface 24 and the connection unit 25. The memory 22 includes an area for storing a control program and a reception buffer for storing received data. The memory 23 stores telephone numbers, home network information, roaming destination information, a mode flag MDF used as a flag to set the intermittent reception ratio, and a setting flag FXF used to designate permanently fixed setting or fixed setting of the intermittent reception ratio. The memory 23 may also store product type information related to the apparatus and information related to the manufacturer of the apparatus.

The processor 21 controls the units of the apparatus in accordance with the control program stored in the memory 22. The processor 21 causes the power supply control unit 5 to supply the operating power to the reception unit 19 and the communication controller 16 for detection of a call from the base station 30, at an interval determined by the intermittent reception ratio designated by the mode flag MDF stored in the memory 23.

The conventional intermittent reception ratio may be 1/36, meaning that 1 subframe in 1 superframe is used for reception. According to the invention, extended intermittent reception ratios such as 1/72 (1 subframe in a total of 2 superframes), 1/108 (1 subframe in a total of 3 superframes) and the like are available. The intermittent reception ratio may be set by the extended information items contained in the announcement information from the base station 30.

The terminal device 32 and the mobile communication apparatus may be connected to each other via the connection unit 25 so that the terminal device 32 sets the intermittent reception ratio. In this case, the connection unit 25 may be provided with a connector so that a cable coupled to the connector connects to the terminal device 32. The connection unit 25 may also be implemented by an infrared transmission and reception unit and the terminal device 32 may also be provided with an infrared transmission and reception unit, so that the intermittent reception ratio is set by performing infrared communication.

Figure 1B:
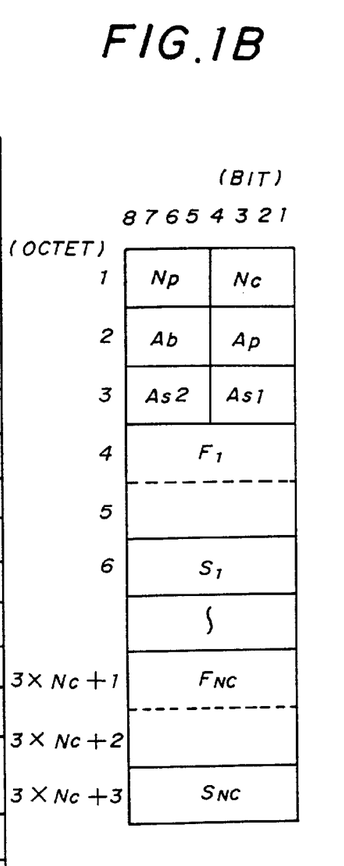
Figure 3:
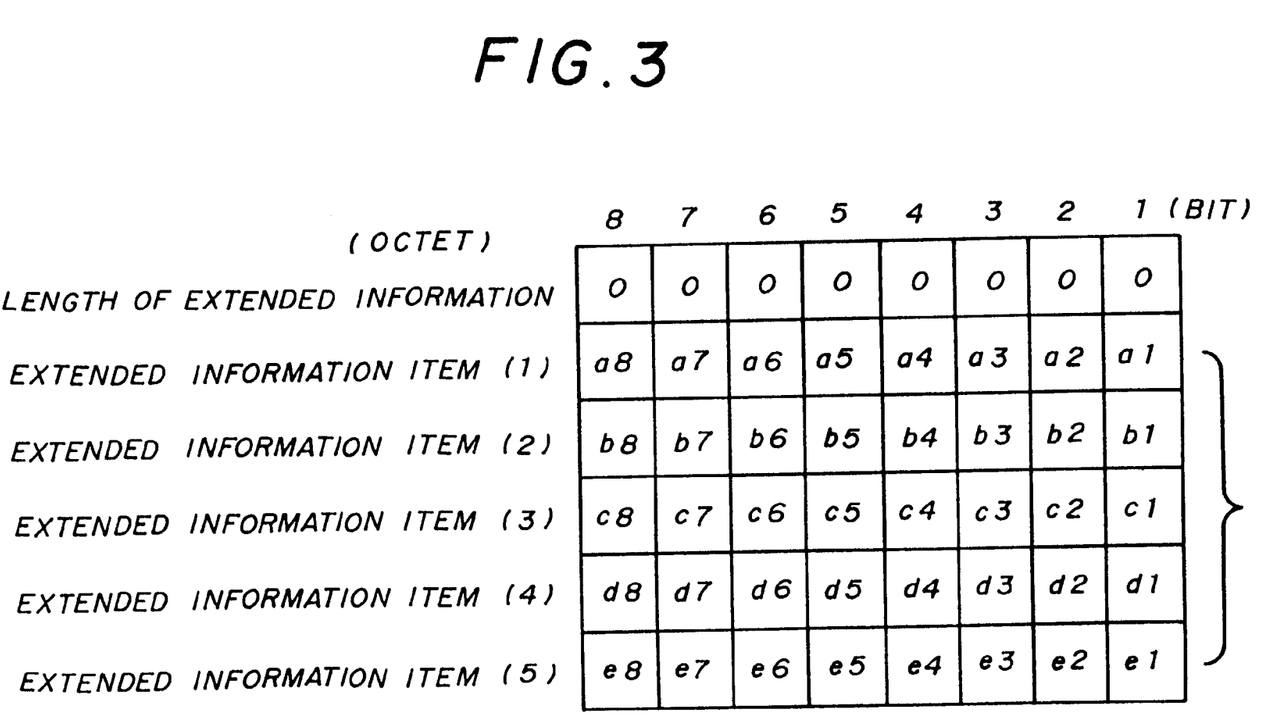
FIG. 3 shows extended information items according to the embodiment.

FIG. 3 shows extended information items according to the embodiment of the present invention. As shown in FIG. 1A and 1B, the extended information items are among the information items contained in the announcement information. Referring to FIG. 3, the extended information items include the length of the extended information items, and individual extended information items (1)–(5). At the top row of FIG. 3, "00000101" indicates that each of the extended information items has a length of 5 bytes. The individual extended information items (1)–(5) may be set depending on the manufacturer or the product type.

The individual extended information item (1) comprises bits a1–a8, the individual extended information item (2) comprises bits b1–b8, the individual extended information item (3) comprises bits c1–c8, the individual extended information item (4) comprises bits d1–d8, and the individual extended information item (5) comprises bits e1–e8. Bits n1, that is, bits a1, b1, c1, d1 and e1 are used as bits to request permanently fixed setting or fixed setting of the intermittent reception ratio. When bit n1=0, the apparatus operates at the permanently fixed intermittent reception ratio designated by the higher bits n2–n8, that is, bits a2–a8, b2–b8, c2–c8, d2–d8 and e2–e8 (permanently fixed setting). When bit n1=1, the apparatus operates at the intermittent reception ratio designated by the higher bits n2–n8. However, the extended information items continue to be monitored and, when a change is detected in the extended information items, the intermittent reception ratio in accordance with the extended information items after the change is used (fixed setting).

Bits n2 (a2, b2, . . . e2) are used to control the basic intermittent reception ratio/extended intermittent reception ratio. When n2=0, the basic intermittent reception ratio designated by the control channel construction information contained in the announcement information is used, instead of the extended intermittent reception ratio designated by the higher bits n3–n8. When n2=1, the apparatus operates at the extended intermittent reception ratio designated by the higher bits n3–n8.

Bits n3–n8 (a3–a8, b3–b8, . . . e3–e8) are used to designate the extended intermittent reception ratio. For example, when bits n3–n8 are "000001", an extended (that is, extended by the factor of 2) intermittent reception ratio of 1/72 is used. When bits n3–n8 are "000010", an extended (that is, extended by the factor of 3) intermittent reception ratio of 1/108 is used. When bits n3–n8 are "000100", an extended (that is, extended by the factor of 4) intermittent reception ratio of 1/144 is used. When bits n3–n8 are "001000", an extended (that is, extended by the factor of 5) intermittent reception ratio of 1/180 is used. When bits n3–n8 are "010000", an extended (that is, extended by the factor of 6) intermittent reception ratio of 1/216 is used. When bits n3–n8 are "100000", an extended (that is, extended by the factor of 7) intermittent reception ratio of 1/252 is used.

Figure 4:
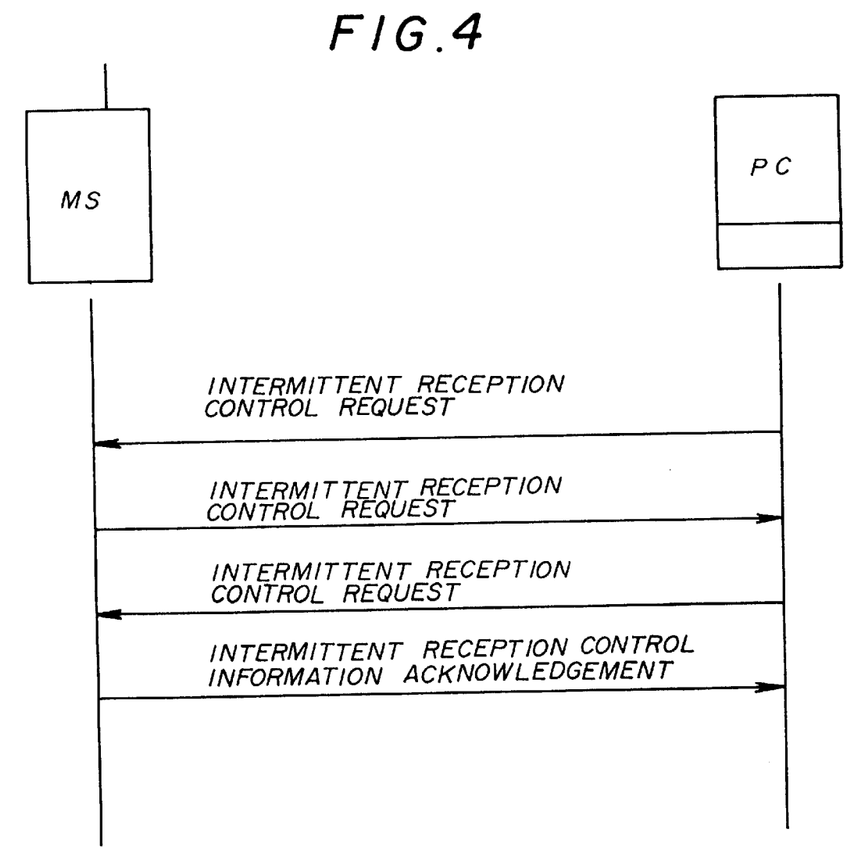
FIG. 4 shows a sequence of setting an intermittent reception ratio according to the embodiment.

FIG. 4 shows a sequence of setting a intermittent reception ratio according to the embodiment of the present invention. According to the sequence of FIG. 4, the intermittent reception ratio is controlled by a terminal device such as a personal computer PC. The mobile communication apparatus MS is connected to the personal computer PC by a cable connection or an infrared connection for communication therebetween. The personal computer PC transmits an intermittent reception control request. When the processor 21 of the mobile communication apparatus MS detects the intermittent reception control request via the connection unit 25, the serial data interface unit 24 and the common bus 4, the processor 25 returns an intermittent reception control response to the personal computer PC.

Upon receipt of the intermittent reception control response from the mobile communication apparatus MS, the personal computer PC sends intermittent reception control information to the mobile communication apparatus MS, whereupon the mobile communication apparatus MS returns an intermittent reception control information acknowledgement to the personal computer PC. The intermittent reception control information is stored in the memory 23 under the control of the processor 21.

Figure 5A:
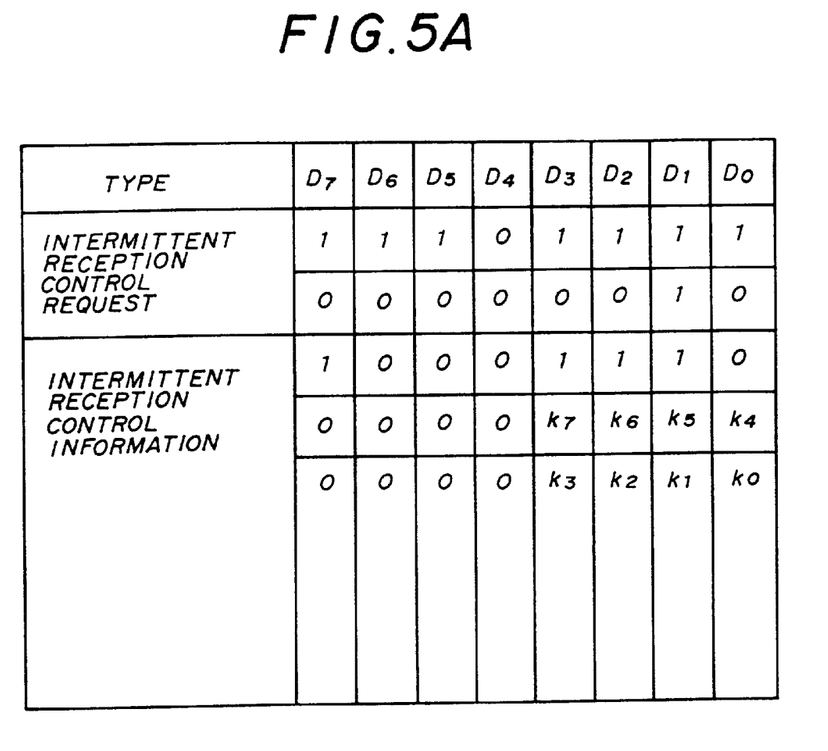
FIG. 5A shows how an upstream serial signal is constructed.
Figure 5B:
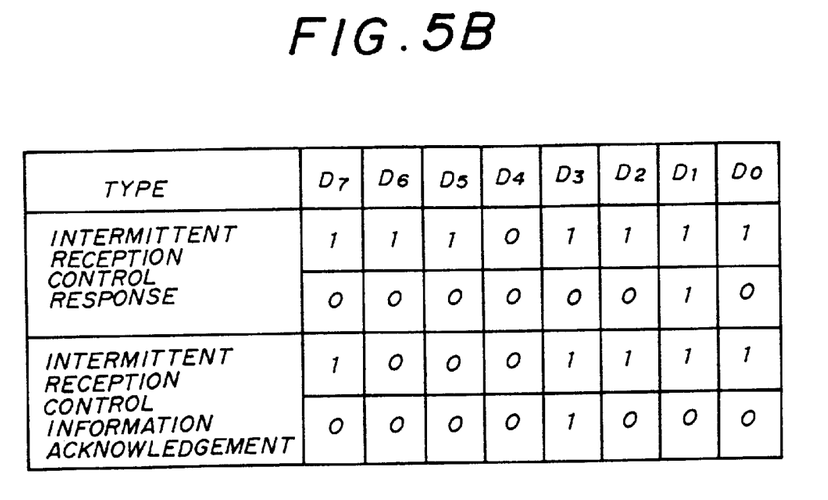
FIG. 5B shows how a downstream serial signal is constructed.

FIGS. 5A and 5B show how the intermittent reception control request, the intermittent reception control response, the intermittent reception control information and the intermittent reception control information acknowledgement are constructed according to the embodiment of the present invention. FIG. 5A shows how an upstream serial signal (from the personal computer PC to the mobile communication apparatus MS) is constructed; and FIG. 5B shows how a downstream serial signal (from the mobile communication apparatus MS to the personal computer PC) is constructed. For example, as shown in FIG. 5A, the intermittent reception control request carried in the upstream serial signal may comprise 2 bytes and the intermittent reception control information may comprise 3 bytes.

The first byte of the intermittent reception control information is used as a header portion. Bits k0–k7 in the second and third bytes correspond to bits n1–n8 of the extended information items. When k0=0, the intermittent reception ratio is permanently fixed. When k0=1, the intermittent reception ratio is fixed but may be changed depending on the intermittent reception control information that follows. When k1=0, the basic intermittent reception ratio is set. When k1=1, the extended intermittent reception ratio is set. When bits k7, k6, . . . k2 are "000001", the basic intermittent reception ratio is extended by the factor of 2; when bits k7, k6, . . . k2 are "000010", the basic intermittent reception ratio is extended by the factor of 3; when k7, k6, . . . k2 are "000100", the basic intermittent reception ratio is extended by the factor of 4; when k7, k6, . . . k2 are "001000", the basic intermittent reception ratio is extended by the factor of 5; when k7, k6, . . . k2 are "010000", the basic intermittent reception ratio is extended by the factor of 6; when k7, k6, . . . k2 are "100000", the basic intermittent reception ratio is extended by the factor of 7.

Referring to FIG. 5B, each of the intermittent reception control response and the intermittent reception control information acknowledgement carried in the downstream serial signal comprises 2 bytes. When the control by the mobile communication apparatus MS receiving the intermittent reception control request from the personal computer PC is disabled, the mobile communication apparatus MS may respond to the personal computer PC indicating that the control is disabled or may not respond to the personal computer PC at all so that the process is terminated as a result of a time15 out in the personal computer PC.

Figure 6:
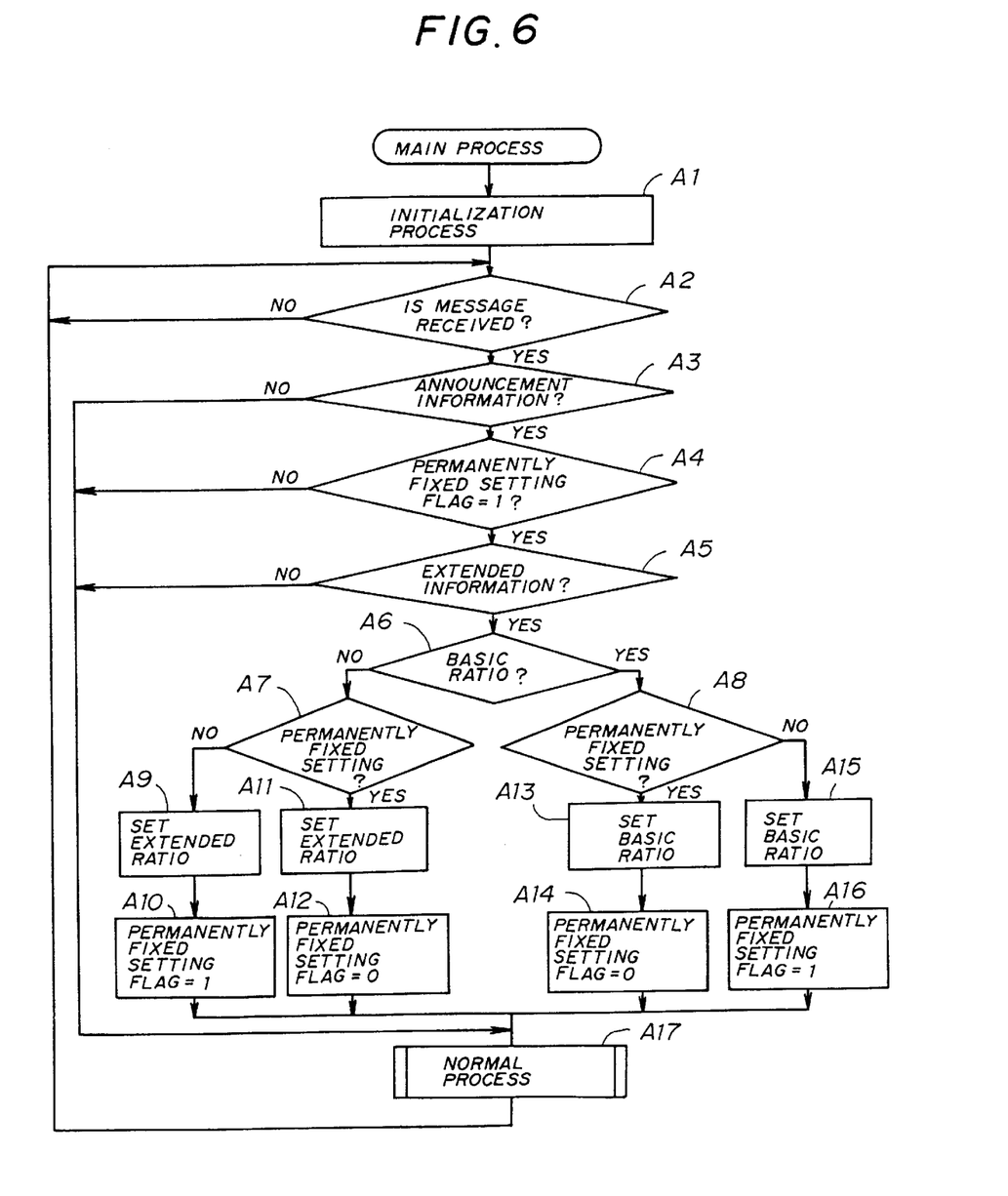
FIG. 6 is a flowchart showing a process for controlling the intermittent reception ratio according to the embodiment.

FIG. 6 is a flowchart showing a process for controlling the intermittent reception ratio according to the embodiment. According to the flow of FIG. 6, the intermittent reception ratio of the mobile communication apparatus is set in accordance with the extended information items contained in the announcement information from the base station.

Subsequent to an initializing process (A1) of the mobile communication apparatus, a determination is made as to whether a message is received (A2). If a message is received, a determination is made as to whether announcement information is received (A3). If announcement information is received, a determination is made as to whether a permanently fixed setting flag is set to "1" (A4). If the permanently fixed setting flag is set to "1", a determination is made as to whether extended information items are contained in the announcement information (A5). If extended information items are contained, a determination is made as to whether basic ratio setting is designated (A6).

If the basic ratio setting is not designated, a determination is made as to whether the permanently fixed setting is designated (A7). If the permanently fixed setting is not designated, an extended ratio is set (A9) and the permanently fixed setting flag is set to "1" (A10). For example, the steps through A10 are performed when the extended information items shown in FIG. 3 are such that n1=1 and n2=1. More specifically, in step A9, the intermittent reception ratio designated by bits n3–n8 is set. Control is then turned to A17, wherein the mobile communication apparatus performs ordinary processes adapted for the setting, including an intermittent reception process, a call incoming process, a call originating process, a call proceeding process and the like. If it is determined in A7 that the permanently fixed setting is designated, an extended ratio is set (A11) and the permanently fixed setting flag is set to "0" (A12).

If it is determined in A6 that the basic ratio is designated, a determination is made as to whether the permanently fixed setting is designated (A8). If the permanently fixed setting is designated, the basic ratio is set (A13) and the permanently fixed setting flag is set to "0" (A14). If it is determined that permanently fixed setting is not designated, the basic ratio is set (A15) and the permanently fixed setting flag is set to "1" (A16).

For example, when n1=0 (permanently fixed setting) and n2=0 (basic ratio setting) in the extended information items shown in FIG. 3, it is determined in A6 that the basic ratio is to be set and it is determined in A8 that the basic ratio is permanently fixed. Subsequently, associated steps are executed in A13 and A14.

Figure 7:
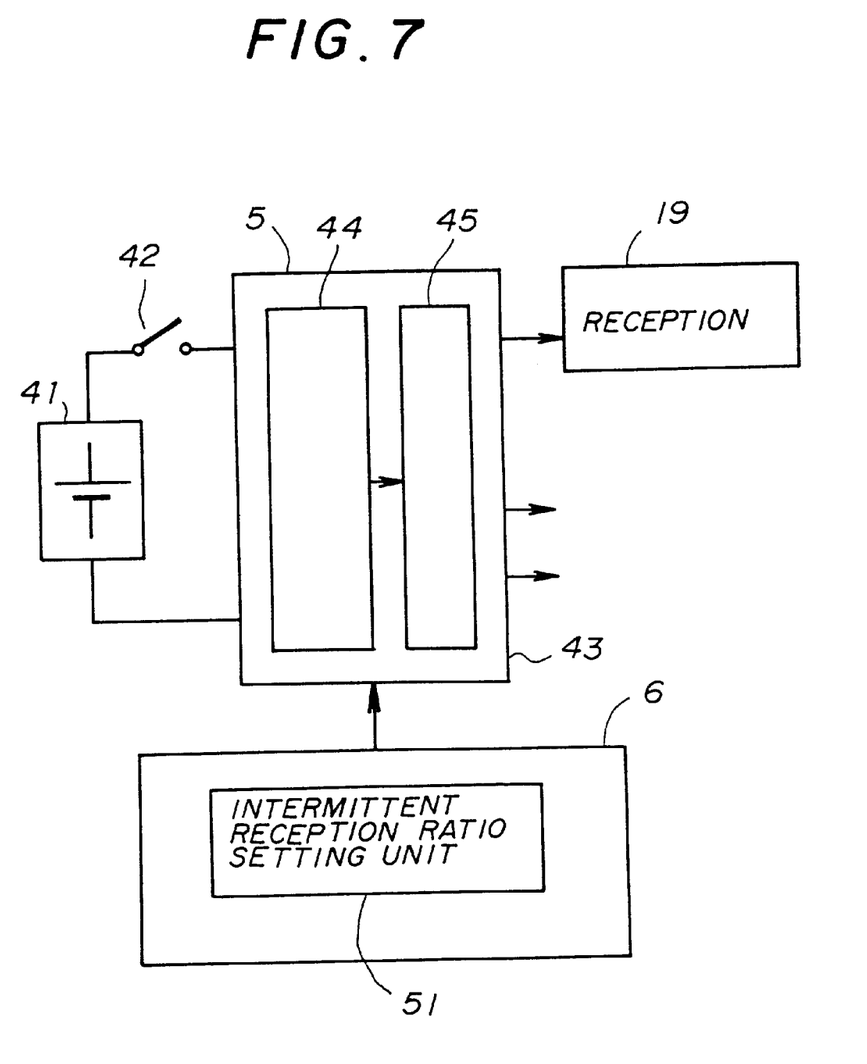
FIG. 7 shows a power supply control unit and a control unit according to the embodiment.

FIG. 7 shows the power supply control unit 5 and the main control unit 6 according to the embodiment of the present invention. The power supply control 5 comprises a battery 41, a main switch 42 and a distribution control unit 43. The distribution control unit 43 includes a stabilizing unit 44 implemented by a switching regulator or the like, and a distributing unit 45 for connecting at least the reception unit 19 to the operating power when intermittent reception is performed. The main control unit 6 is provided with an intermittent reception ratio setting unit 51. The distributing unit 45 of the distribution control unit 43 is controlled in accordance with the intermittent reception ratio set in the intermittent reception ratio setting unit 51.

The intermittent reception ratio setting unit 51 of the main control unit 6 is implemented by a processing capability of the processor 21 and a construction shown in FIG. 2 including the processor 21 and an area in the memory 23 storing MDF and FXF. As described above, an intermittent reception ratio designated by the extended information items contained in the announcement information from the base station or by the control information from the terminal device is set in the intermittent reception ratio setting unit 51. By employing intermittent reception, the power consumption is reduced. In the above-described embodiment, the reception ratio may be extended to 1/252, 1/7 of the maximum basic ratio. A simple calculation shows that the conventional wait time is extended by the factor of 7. Given that the wait time may remain the same, the battery size can be reduced accordingly.

When a mobile communication apparatus is located in a zone served by the base station for the home network for the mobile communication apparatus, the intermitting reception ratio is modified in accordance with the extended information items contained in the announcement information from the base station. When the mobile communication apparatus moves to a zone served by a base station for a roaming network, the roaming destination network information and the like stored in the memory 23 is referred to so as to determine whether the mobile communication apparatus is located in the home network or the roaming network. If it is determined that the mobile communication apparatus is located in the roaming network, the basic ratio is set in the intermittent reception ratio setting unit 51 so that the mobile communication apparatus waits at the basic ratio. Determination that the mobile communication apparatus is located in the roaming network is necessary because the home network and the roaming network may differ in details of the operation.

The present invention is not limited to the above described embodiments, and variations and modifications may be made without departing from the scope of the present invention.

What is claimed is:

1. A mobile communication system comprising:

a base station; and a plurality of mobile communication apparatuses called by said base station at predetermined intervals, wherein said mobile communication apparatus comprises:

a power supply control unit for supplying an operating power from a battery to said mobile communication apparatus;

an intermittent reception ratio setting unit for setting an intermittent reception ratio between a period of calls from said base station to the mobile communication apparatus and a period of intermittent reception effected by associated periodic supply of the operating power from the battery, and for controlling said power supply control unit in accordance with the intermittent reception ratio;

wherein said intermittent reception ratio setting unit comprises a memory for storing setting information containing a first bit indicating one of a permanently fixed setting and a fixed setting, a second bit indicating whether a basic intermittent reception ratio or an extended intermittent reception ratio is to be set, and a bit train indicating a factor by which the basic intermittent reception ratio is to be multiplied.

2. The mobile communication system as claimed in claim 1, wherein said base station notifies the mobile communication apparatus of the intermittent reception ratio, using extended information items in announcement information delivered from said base station to the mobile communication apparatus, and wherein the mobile communication apparatus sets the intermittent reception ratio designated by the extended information items in said intermittent reception ratio setting unit.

3. The mobile communication system as claimed in claim 1, wherein said mobile communication apparatus sets, in said intermittent reception ratio setting unit, the intermittent reception ratio designated by extended information items contained in announcement information from said base station of a home network.

4. The mobile communication system as claimed in claim 1, wherein the mobile communication apparatus disregards the intermittent reception ratio designated by extended information items contained in announcement information from said base station of a roaming network, and sets a basic intermittent reception ratio in said intermittent reception ratio setting unit.

5. The mobile communication system as claimed in claim 2, wherein the extended information items contained in the announcement information designate one of a permanently fixed basic intermittent reception ratio, a fixed basic intermittent reception ratio, a permanently fixed extended intermittent reception ratio and a fixed extended intermittent reception ratio; a determination is made as to whether the intermittent reception ratio is to be modified by referring to the extended information items; and said intermittent reception ratio setting unit is controlled accordingly.

6. The mobile communication system as claimed in claim 1, wherein the mobile communication apparatus comprises a connection unit for connecting with a terminal device by one of a cable connection and an infrared connection, and wherein the intermittent reception ratio setting unit to be set in said intermittent reception ratio is determined by referring to intermittent reception ratio setting information provided by said terminal device via said connection unit.

7. A mobile communication apparatus comprising:
   a ratio unit including a transmission unit and a reception unit so as to perform transmission and reception with respect to a base station;
   a codec unit for encoding a speech signal and decoding an encoded signal;
   a speech signal processing unit for subjecting a speech signal to analog/digital conversion;
   a main control unit for controlling the entirety of the mobile communication apparatus;
   a power supply control unit for supplying an operating power from a battery to components of the mobile communication apparatus; and
   an intermittent reception ratio setting unit for setting an intermittent reception ratio between a period of calls from said base station to the mobile communication apparatus and a period of intermittent reception effected by associated periodic supply of the operating power from the battery, and for controlling said power supply control unit in accordance with the intermittent reception ratio;
   wherein said intermittent reception ratio setting unit comprises a memory for storing setting information containing a first bit indicating one of a permanently fixed setting and a fixed setting, a second bit indicating whether a basic intermittent reception ratio or an extended intermittent reception ratio is to be set, and a bit train indicating a factor by which the basic intermittent reception ratio is to be multiplied.

* * * * *